United States Patent
Xu et al.

(10) Patent No.: US 10,474,897 B2
(45) Date of Patent: Nov. 12, 2019

(54) SMART SECURITY INSPECTION SYSTEM AND METHOD

(71) Applicant: Nuctech Company Limited, Beijing (CN)

(72) Inventors: Jia Xu, Beijing (CN); Hu Tang, Beijing (CN); Qingping Huang, Beijing (CN); Ying Fan, Beijing (CN)

(73) Assignee: Nuctech Company Limited, Beijing (CN)

( * ) Notice: Subject to any disclaimer, the term of this patent is extended or adjusted under 35 U.S.C. 154(b) by 30 days.

(21) Appl. No.: 15/271,151

(22) Filed: Sep. 20, 2016

(65) Prior Publication Data

US 2017/0083768 A1  Mar. 23, 2017

(30) Foreign Application Priority Data

Sep. 21, 2015  (CN) .......................... 2015 1 0605253

(51) Int. Cl.
*G06F 9/00* (2006.01)
*G06T 7/00* (2017.01)
*G06K 9/00* (2006.01)

(52) U.S. Cl.
CPC ........ *G06K 9/00671* (2013.01); *G06T 7/0002* (2013.01); *G06K 2209/09* (2013.01);
(Continued)

(58) Field of Classification Search
CPC .... G06Q 10/02; G06Q 10/08; G06Q 10/0832; G06Q 10/025; G06Q 50/26;
(Continued)

(56) References Cited

U.S. PATENT DOCUMENTS

| 8,779,889 B2 * | 7/2014 | Bayne ................. G07C 9/00111 340/5.1 |
| 9,334,115 B2 * | 5/2016 | Bartelet ................... B65G 1/10 |

(Continued)

FOREIGN PATENT DOCUMENTS

| CN | 104464058 A | 3/2015 |
| CN | 104502368 A | 4/2015 |

(Continued)

OTHER PUBLICATIONS

Extended European Search Report dated Feb. 23, 2017, in European Application No. 16188906.8; 9 pages.
(Continued)

*Primary Examiner* — Michael S Osinski
(74) *Attorney, Agent, or Firm* — Knobbe, Martens, Olson & Bear LLP

(57) ABSTRACT

The disclosure relates to smart security inspection systems and methods. One illustrative method may comprise distributing, by the system, a security inspection tray to a person to be inspected through an unpacking station and associating/binding information regarding the person to be inspected to a baggage identifier, and identifying the baggage identifier, obtaining the information of the person to be inspected according to the baggage identifier, obtaining pre-stored risk information according to the information of the person to be inspected, performing differentiated security inspections on the person to be inspected and/or baggage according to the risk information, and associating/binding the obtained data to the information of the person to be inspected. Further implementations relate to features such as processing identity information, controlling flow in the baggage handling area(s), imaging baggage, packing the baggage, and finishing the security inspection.

12 Claims, 6 Drawing Sheets

(52) U.S. Cl.
CPC ............... *G06T 2207/10081* (2013.01); *G06T 2207/30112* (2013.01)

(58) Field of Classification Search
CPC ......... G06Q 50/265; B64F 1/36; B64F 1/368; B64F 1/366–368; G07C 9/00087; G07C 9/00103; G07C 9/00111; G07C 9/00007; G07C 9/00031; G07C 9/00134; G07C 9/00166; G07C 9/00158; G07C 9/02; G06K 9/00671; G06K 2209/09; G06T 7/0002; G06T 2207/10081; G06T 2207/30112

See application file for complete search history.

(56) References Cited

U.S. PATENT DOCUMENTS

| | | | | |
|---|---|---|---|---|
| 9,828,114 | B2* | 11/2017 | Dinkelmann | B07C 5/04 |
| 2001/0032034 | A1* | 10/2001 | Manabe | B64F 1/368 |
| | | | | 700/225 |
| 2004/0035928 | A1* | 2/2004 | Anderson | B64F 1/366 |
| | | | | 235/385 |
| 2004/0098276 | A1* | 5/2004 | Blazey | G06Q 10/08 |
| | | | | 235/376 |
| 2004/0124982 | A1* | 7/2004 | Kovach | G08B 13/2417 |
| | | | | 340/572.1 |
| 2005/0051622 | A1* | 3/2005 | Mak | B64F 1/366 |
| | | | | 235/384 |
| 2005/0146417 | A1* | 7/2005 | Sweatte | G07C 9/00087 |
| | | | | 340/5.2 |
| 2007/0008138 | A1* | 1/2007 | Mosher, Jr. | G06K 7/0008 |
| | | | | 340/572.4 |
| 2007/0280502 | A1 | 12/2007 | Paresi et al. | |
| 2007/0284481 | A1* | 12/2007 | Linero | B64D 9/00 |
| | | | | 244/137.1 |
| 2009/0276089 | A1* | 11/2009 | Bartholomew | G06Q 10/02 |
| | | | | 700/235 |
| 2010/0076796 | A1* | 3/2010 | Klein | B64F 1/368 |
| | | | | 705/5 |
| 2010/0117790 | A1* | 5/2010 | Bayne | G07C 9/00111 |
| | | | | 340/5.21 |
| 2010/0308108 | A1* | 12/2010 | Choi | G07C 9/00087 |
| | | | | 235/382 |
| 2012/0062367 | A1* | 3/2012 | Warther | G06K 19/04 |
| | | | | 340/10.1 |
| 2012/0228377 | A1 | 9/2012 | Carpenter et al. | |
| 2012/0263350 | A1* | 10/2012 | Delianski | G06Q 10/08 |
| | | | | 382/103 |
| 2013/0211864 | A1* | 8/2013 | Sanderson | B64F 1/366 |
| | | | | 705/5 |
| 2013/0241712 | A1* | 9/2013 | Motley, III | G06K 19/0717 |
| | | | | 340/10.51 |
| 2014/0241837 | A1* | 8/2014 | Bartelet | B65G 1/10 |
| | | | | 414/277 |
| 2015/0039354 | A1* | 2/2015 | Murphy | G06Q 10/02 |
| | | | | 705/5 |
| 2016/0117876 | A1* | 4/2016 | Arpin | G07C 9/00087 |
| | | | | 340/5.52 |
| 2016/0189096 | A1* | 6/2016 | Tang | G01V 5/0033 |
| | | | | 705/332 |
| 2016/0371306 | A1* | 12/2016 | Dengler | G06Q 10/08 |
| 2017/0004444 | A1* | 1/2017 | Krasko | G06Q 10/0833 |
| 2017/0068930 | A1* | 3/2017 | Attar | G06Q 10/087 |
| 2017/0185842 | A1* | 6/2017 | Chen | H04N 19/44 |
| 2017/0270477 | A1* | 9/2017 | Wong | B64F 1/366 |
| 2018/0029724 | A1* | 2/2018 | Dinkelmann | G01G 19/52 |
| 2018/0032923 | A1* | 2/2018 | Sanderson | B64F 1/366 |
| 2018/0075297 | A1* | 3/2018 | Lee | G06K 9/00442 |
| 2018/0173967 | A1* | 6/2018 | Chen | G06T 7/0004 |
| 2018/0268272 | A1* | 9/2018 | Soderberg | G06Q 10/02 |
| 2019/0197268 | A1* | 6/2019 | Moreno | G06K 7/10366 |
| 2019/0213698 | A1* | 7/2019 | Savian | G06Q 10/02 |

FOREIGN PATENT DOCUMENTS

| | | |
|---|---|---|
| CN | 204287075 U | 4/2015 |
| CN | 104597514 A | 5/2015 |
| CN | 204314911 U | 5/2015 |
| EP | 2040741 A1 | 7/2016 |
| WO | WO 2014/198821 A1 | 12/2014 |

OTHER PUBLICATIONS

International Search Report and Written Opinion dated Oct. 27, 2016, in PCT Application No. PCT/CN2016/093278 (11 pgs), as well as English-language translation of the ISR (2 pgs); 13 pages total.

Australian Examination Report for application No. 2016327871 dated Jul. 31, 2018 (6 pages).

McLay et al., "Risk-Based Policies for Airport Security Checkpoint Screening", Transportation Science, vol. 44, No. 3, Aug. 2010, pp. 333-349.

Wang, "Efficiency, safety or equality" The People's Daily, Jun. 16, 2011, the 16th edition.

Wong et al., "Evolving risk-based security: A review of current issues and emerging trends impacting security screening in the aviation industry", Journal of Air Transport Management 48 (2015) 60-64.

Examination Search Report issued in AU Patent application No. 2016327871, dated Apr. 23, 2019.

Office Action issued in CN Patent application No. 2015106052536, dated Apr. 15, 2019.

Office Action in Canadian Patent Application No. 2,978,161, issued as patent Sep. 18, 2019, which has common priority with this application.

* cited by examiner

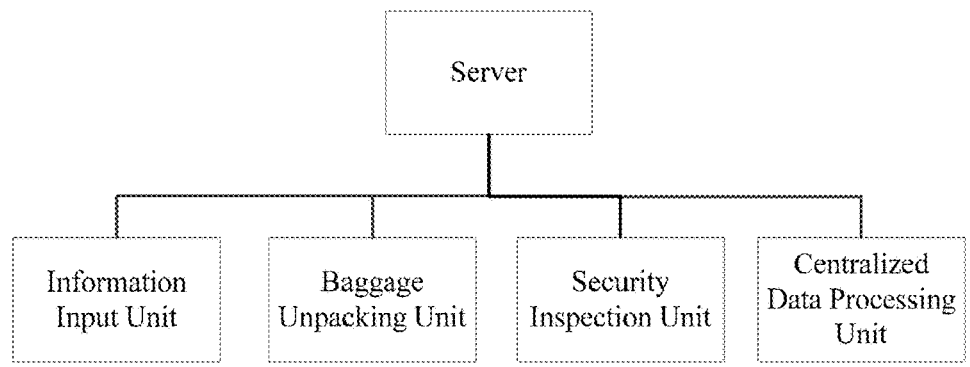

FIG. 2

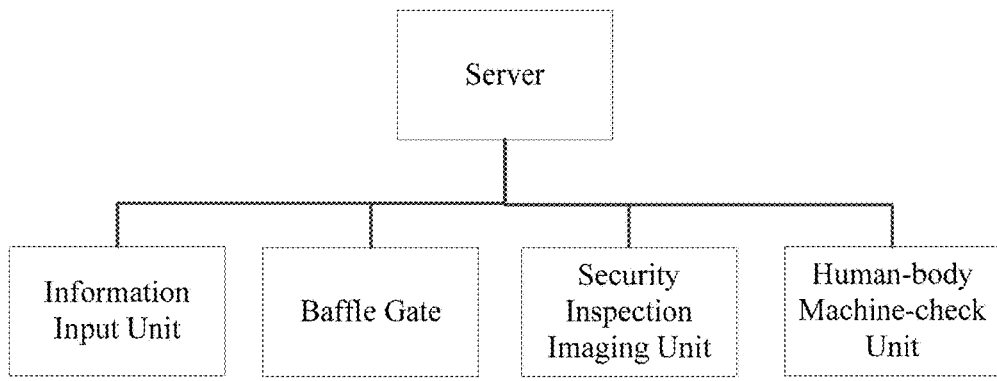

FIG. 3

Distribute Security Inspection Tray To Person To Be Inspected, And Bind Information Of Person To Be Inspected To Baggage Identifier Identify Baggage Identifier, Obtain Information Of Person To Be Inspected According To Baggage Identifier, Obtain Pre-stored Safety Level Information According To Information Of Person To Be Inspected, Perform Differentiated Security Inspections On Baggage In Tray According To Safety Level Information, And Bind Security Inspection Result Of Inspected Baggage To Information Of Person To Be Inspected Pack Baggage And Finish Security Inspection

FIG. 4

SMART SECURITY INSPECTION SYSTEM AND METHOD

CROSS REFERENCE TO RELATED APPLICATION(S)

This application is based upon and claims benefit/priority of Chinese Patent Application No. 201510605253.6, filed on Sep. 21, 2015, published as CN106548263A on Mar. 29, 2017, which is incorporated herein by reference in entirety.

BACKGROUND

Field

The present disclosure relates to a field of security check, and more specifically to smart security inspection systems and methods.

Description of Related Information

Existing security inspection systems are generally used in public places, such as border checkpoint, airports, railway stations, bus stations and so on. At these crowded places, criminals often commit offences with prohibited articles, such as knives and guns, which causes serious casualties and great property loss and adversely affects the public well-being. Security check systems play an important role in these places to prevent harm to the public.

Current security inspection channels for passengers are merely simple integration of various security inspection devices, and the security inspection is performed depending on the coordination of security inspectors. Therefore, there are defects of high labor cost, low overall security inspection efficiency, disordered management of passengers and their baggage, etc. In order to solve the above problems, there is a need for an integrated security inspection device which is highly integrated and is capable to reduce labor cost. Moreover, smart security inspection cannot be realized in the current security inspection channels for passengers, thus operators will have a high workload.

OVERVIEW OF SOME ASPECTS

An object of the present disclosure is to improve an overall efficiency of security inspection channels and reduce labor cost.

In order to achieve the above object of the present disclosure, the present disclosure provides smart security inspection systems and methods.

According to an aspect, the present disclosure provides a smart security inspection system, comprising: a server, an information input unit in an information input area, a baggage unpacking unit in a baggage packing/unpacking area, a security inspection unit in a security inspection area, and a centralized data processing unit in a processing area; the baggage packing/unpacking area is arranged upstream of the security inspection area; the information input area is arranged upstream of the baggage packing/unpacking area, the processing area is arranged far away or close to the security inspection area; the information input unit, the baggage unpacking unit, the security inspection unit and the centralized data processing unit are in communication connection with the server, respectively; the information input unit obtains information of a person to be inspected; the baggage unpacking unit obtains the information of the person to be inspected and distributes a baggage identifier to a piece of baggage to be inspected of the person to be inspected; the baggage unpacking unit binds the baggage identifier and the information of the person to be inspected; the security inspection unit obtains pre-stored risk information according to the information of the person to be inspected, performs differentiated security inspections on the person to be inspected and/or the baggage according to the risk information, and sends obtained data to the centralized data processing unit; the centralized data processing unit evaluates the person to be inspected and/or the baggage according to the data, generates a security inspection result, and binds the security inspection data and the security inspection result with the information of the person to be inspected.

In some systems, the baggage unpacking unit comprises a plurality of baggage unpacking stations, each of which corresponds to a person to be inspected, and distributes the baggage identifier and binds the information of the person to be inspected to the baggage identifier.

Further, a baffle gate may be arranged at an entrance of the baggage packing/unpacking area; the baffle gate being connected with the server; wherein the server obtains the number of persons to be inspected in the baggage packing/unpacking area, and the baffle gate is opened or closed according to the number.

According to implementations herein, an illustrative system may further comprise an image acquisition unit. Here, for example, before the baggage to be inspected enters the security inspection unit, the image acquisition unit acquires an image of the baggage to be inspected and identifies the baggage identifier, and binds the acquired image of baggage to the baggage identifier.

In some embodiments, the server matches the information of the person to be inspected with the data and/or the security inspection result and stores them According to another aspect, the present disclosure also provides a smart security inspection method, comprising the following steps: distributing a baggage identifier to a piece of baggage to be inspected of a person to be inspected and binding the baggage identifier to information of the person to be inspected at a baggage unpacking station; and identifying the baggage identifier, obtaining the information of the person to be inspected according to the baggage identifier, obtaining pre-stored risk information according to the information of the person to be inspected, performing differentiated security inspections on the person to be inspected and/or the baggage according to the risk information, performing centralized processing on obtained data, and binding obtained security inspection result to the information of the person to be inspected.

According to implementations herein, a method may further comprise the step of inputting and verifying identity information of the person to be inspected before obtaining the information of the person to be inspected.

In some embodiments, method(s) may further comprise simultaneously distributing baggage identifiers to a plurality of persons to be inspected in the baggage packing/unpacking area, and controlling a number of the persons to be inspected entering the baggage packing/unpacking area according to a number of the persons to be inspected in the baggage packing/unpacking area.

Consistent with some aspects, methods may further comprise the step of taking an image of the baggage and binding the image to the baggage identifier prior to the step of performing the differentiated security inspections on the person to be inspected and/or the baggage.

According to some implementations, methods may further comprise the step of matching the information of the person to be inspected with the data and/or the security inspection result and storing them.

The smart security inspection systems and methods according to the present disclosure are capable of obtaining the risk information related to the person to be inspected according to the information of the person to be inspected, checking the person to be inspected and the baggage to be inspected using differentiated automatic identification algorithms or inspection methods according to different risk information, and thus improving the overall identification accuracy. The inspection result of the person to be inspected and that of the baggage to be inspected are bound to the information of the person to be inspected and stored, such that the inspection accuracy and the traceability of the inspection process can be improved.

BRIEF DESCRIPTION OF THE DRAWINGS

FIG. 2 is a schematic diagram of a first structure of a smart security inspection system according to one or more aspects consistent with the present innovations.

FIG. 3 is a schematic diagram of a second structure of a smart security inspection system according to one or more aspects consistent with the present innovations.

FIG. 4 is an exemplary flow diagram of an illustrative smart security inspection method according to one or more aspects consistent with the present innovations.

DETAILED DESCRIPTION OF ILLUSTRATIVE IMPLEMENTATIONS

Exemplary embodiments will be described in detail with reference to the drawings. However, the present disclosure should not be taken to limit the disclosure to the specific embodiments shown, but are for explanation and understanding only.

Figure 1:
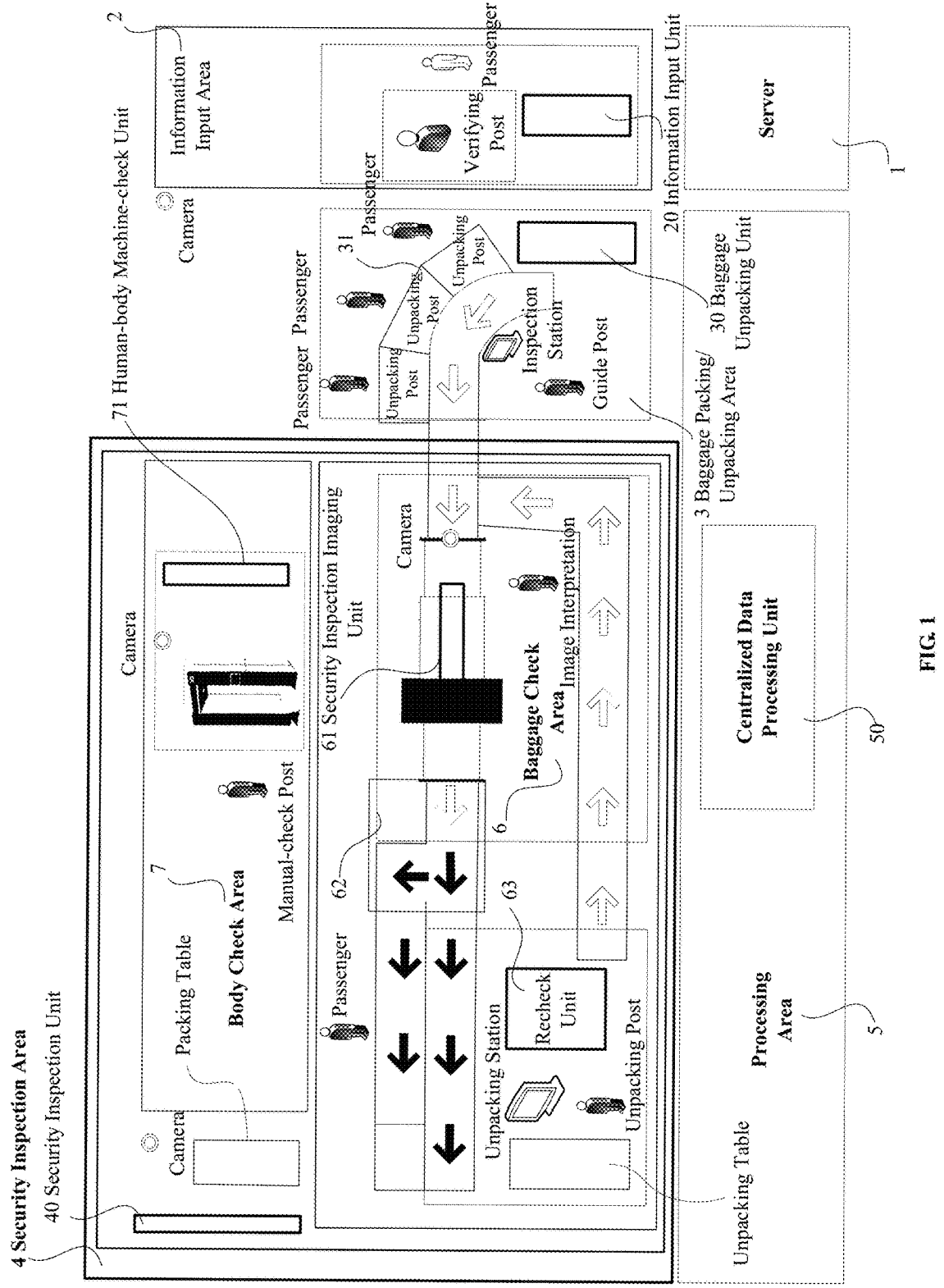
FIG. 1 is a schematic diagram of a layout of an illustrative smart security inspection system according to one or more aspects consistent with the present innovations.

As shown in FIG. 1, the present disclosure provides a smart security inspection system, comprising: a server 1, an information input unit 20 in an information input area 2, a baggage unpacking unit 30 in a baggage packing/unpacking area 3, a security inspection unit 40 in a security inspection area 4, and a centralized data processing unit 50 in a processing area 5; the baggage packing/unpacking area 3 is arranged upstream of the security inspection area 4; the information input area 2 is arranged upstream of the baggage packing/unpacking area 3; the processing area 5 is arranged far away or close to the security inspection area 4; the information input unit 20, the baggage unpacking unit 30, the security inspection unit 40 and the centralized data processing unit 50 are in communication connection with the server 1, respectively; the information input unit 20 obtains information of a person to be inspected; the baggage unpacking unit 30 obtains the information of the person to be inspected and distributes a baggage identifier to a piece of baggage to be inspected of the person to be inspected; the baggage unpacking unit 30 binds the baggage identifier and the information of the person to be inspected; the security inspection unit 40 obtains pre-stored risk information according to the information of the person to be inspected, performs differentiated security inspections on the person to be inspected and/or the baggage according to the risk information, and sends obtained data to the centralized data processing unit 50; the centralized data processing unit 50 evaluates the person to be inspected and/or the baggage according to the data, generates a security inspection result, and binds the security inspection data and the security inspection result with the information of the person to be inspected. The smart security inspection system according to the present disclosure will be described below in detail.

As shown in FIG. 1, in the smart security inspection system according to the present disclosure, the security inspection area 4 comprises a baggage check area 6 and a body check area 7; the baggage check area 6 comprises a security inspection imaging unit 61, a baggage distribution unit 62 and a re-check unit 63. The body check area comprises a human-body machine-check unit 71 and a human-body manual-check unit. The baggage packing/unpacking area 3 is arranged upstream of the baggage check area 6, the information input area 2 is arranged upstream of the baggage packing/unpacking area 3, and the processing area 5 is located in a centralized image interpretation section away from the security inspection area. The information input unit 20, the baggage unpacking unit 30, the security inspection imaging unit 61 and the centralized data processing unit 50 are in communication connection with the server 1, respectively. The information input unit 20 obtains and sends information of the person to be inspected to the server 1; the baggage unpacking unit 30 obtains the information of the person to be inspected and distributes the baggage identifier to the baggage to be inspected of the person to be inspected; the baggage unpacking unit 30 binds the baggage identifier and the information of the person to be inspected. The security inspection imaging unit 61 obtains the baggage identifier corresponding to the baggage to be inspected, searches at the server 1 for the information of the person to be inspected according to information of the baggage identifier, obtains the pre-stored risk information according to the information of the person to be inspected, performs differentiated security inspections on the baggage to be inspected, and sends the data obtained by the inspection (including transmission/CT images, trace explosive detection, metal detection and the like) to the centralized data processing unit 50. A security inspection operator views the data obtained by the inspection through the centralized data processing unit 50, determines whether the baggage to be inspected is safe to generate a security inspection result, and binds such information as the security inspection data and result of the baggage to be inspected to the information of the person to be inspected. The server 1 matches the information of the person to be inspected with information of the security inspection image and stores them.

As shown in FIG. 1 and FIG. 2, the information input unit 20 in the information input area 2 is adapted to obtain the information of the person to be inspected and verify the identity information of the person to be inspected. For example, when used at airports, the smart security inspection system can obtain information of a person to be inspected, for example flight information and personal identity, by scanning his/her boarding pass. When used in other places (such as customs, bus stations and the like), the smart security inspection system can obtain identity information of a person to be inspected by scanning his/her identity document or by accessing public security networks. Alternatively, the information of the person to be inspected can also be obtained by manual input. The information of each person to be inspected includes not only abiological information, but also biological information (e.g., facial features, fingerprint, iris, pictures, etc.) and behavior information of the person to be inspected (e.g., voice, actions, etc.). The information input unit 20 is adapted to send the obtained information of the person to be inspected to the server 1.

As shown in FIG. 1 and FIG. 2, in the present disclosure, the baggage unpacking unit 30 in the baggage packing/unpacking area 3 is arranged upstream of the security inspection imaging unit 61. The baggage unpacking unit 30 is connected with the security inspection imaging unit 61 via an automatic conveying system, which conveys the baggage to be inspected and security inspection tray. When the person to be inspected carries the baggage to be inspected to pass through the smart security inspection system, the person to be inspected and the baggage to be inspected are checked separately. The baggage to be inspected should to be loaded in a designated security inspection tray and subjects to the security inspection in order, while the person to be inspected should enter the body check area 7 to subject to human body security inspection. The baggage unpacking unit 30 provides a baggage unpacking station 31 at which the person to be inspected takes out objects (e.g., electronic products such as computers and mobile phones) that should be checked separately. The baggage unpacking unit comprises a plurality of baggage unpacking stations, each of which corresponds to a person to be inspected and obtains the information of the person to be inspected. The baggage unpacking unit 30 obtains the information of the person to be inspected by scanning (e.g., scanning boarding passes, identification cards and the like), or by direct input (e.g., facial features, fingerprints, irises, pictures and the like), or by accessing the server 1. Then, the person to be inspected is distributed with a baggage identifier and a security inspection tray. The baggage identifier may be provided on or independent of the security inspection tray. The baggage identifier are not limited in types, and can be bar code, two-dimensional code, RFID, specific pattern and the like, or may be other identification information. The baggage unpacking unit 30 obtains the information of the person to be inspected and binds the information to the baggage identifier. The baggage unpacking unit 30 automatically or manually distributes the security inspection tray to the baggage to be inspected. For automatic distribution, the security inspection tray may be automatically distributed to the baggage to be inspected through a corresponding automatic control system according to instructions from a user (the security inspection operator or the person to be inspected).

Some passenger may need more time to pack/unpack his/her baggage and thus other following passengers may be obstructed, such that the whole smart security inspection system operates in an idle state and an overall passing rate is affected. To solve this problem, the present disclosure provides a plurality of baggage unpacking stations 31 in the baggage packing/unpacking area 3, such that a number of passengers can pack/unpack their baggage at the same time without affecting each other. Moreover, the information of each person to be inspected entering the baggage packing/unpacking area 3 is bond to the corresponding baggage unpacking station 31. After the information of the person to be inspected is successfully bond to the baggage unpacking station 31, the security inspection tray is ejected from the baggage unpacking station 31, and the baggage unpacking unit 30 obtains the information of the person to be inspected and the baggage identifier and binds them together. In this way, it is possible to accomplish information binding while several persons to be inspected pack/unpack their baggage simultaneously.

As shown in FIG. 1 and FIG. 3, due to a limited size of the baggage packing/unpacking area 3, there are provided a limited number of baggage unpacking stations 31. There is a restriction on the number of the persons to be inspected entering the baggage packing/unpacking area 3, since a crowd of persons to be inspected rushing into the baggage packing/unpacking area 3 may cause crowding and disorder. Hence, a baffle gate is arranged at the entrance of the baggage packing/unpacking area 3. The baffle gate is connected with the server 1. The baffle gate obtains a current number of persons to be inspected in the baggage packing/unpacking area. When the number of the persons to be inspected is smaller than the number of the baggage unpacking stations 31, it is determined that there are one or more unoccupied baggage unpacking stations 31. When there are one or more unoccupied baggage unpacking stations 31, persons to be inspected are allowed to pass through the gate to enter the baggage packing/unpacking area 3. The baffle gate at the entrance is interconnected with the server 1, and the server 1 automatically recognizes the number of the persons to be inspected in the baggage packing/unpacking area 3. When some person(s) to be inspected in the baggage packing/unpacking area 3 goes to subsequent process, the system instructs the gate, through which a certain number of persons to be inspected then are allowed to pass. The gate may automatically determine the number of the persons to be inspected to pass therethrough, and may close automatically after a permitted number of persons to be inspected have passed therethrough.

As shown in FIG. 1 and FIG. 2, after the baggage unpacking unit 30 distributes the security inspection tray the baggage to be inspected in which the baggage to be inspected will be loaded, the automatic conveying system conveys the security inspection tray that carries the baggage to be inspected to the security inspection imaging unit 61, while the person to be inspected leaves the baggage unpacking station 31. A data acquisition unit is arranged before the security inspection imaging unit 61, such that the baggage to be inspected will pass through the data acquisition unit before it enters the security inspection imaging unit 61. The data acquisition unit acquires an image of the baggage to be inspected and identifies the baggage identifier, and binds the acquired image of the baggage to the baggage identifier.

As shown in FIG. 1 and FIG. 2, the security inspection imaging unit 61 obtains the baggage identifier, obtains the information of the person to be inspected according to the binding relation of the baggage identifier and the person to be inspected, obtains the pre-stored risk information according to the information of the person to be inspected, performs differentiated security inspections on the baggage in the tray according to the risk information, and sends the information obtained by the inspection to the centralized data processing unit 50. The security inspection operator views the security inspection information via the centralized data processing unit 50, determines whether the baggage to be inspected is safe to generate the security inspection result, and binds the information (such as security inspection data and result) of the baggage to be inspected to the information of the person to be inspected. When performing differentiated security inspections on the baggage to be inspected, the security inspection imaging unit 61 carries out differentiated smart identification on the baggage to be inspected by using differentiated automatic identification algorithms or inspection methods according to the risk information of the person to be inspected (e.g., a higher risk of carrying explosives, a higher risk of carrying cold arms, a higher risk of carrying chemicals, etc.). Therefore, an accuracy of identification can be improved and an overall identification rate can be increased. While performing differentiated security inspections on the baggage to be inspected, the security inspection imaging unit 61 also accomplishes radiation imaging on the baggage to be inspected to obtain the security inspection image of the baggage to be inspected. The security inspection imaging unit 61 binds the security inspection image to the baggage identifier. Meanwhile, the security inspection imaging unit 61 evaluates whether the baggage to be inspected contains suspected objects according to the security inspection image obtained by radiation imaging.

The security inspection imaging unit 61 may be an X-ray security inspection device or other security inspection devices for the baggage to be inspected (such as a trace explosive detector and the like) or a combination thereof. The X-ray security inspection device of the security inspection imaging unit 61 may be a dual-view security inspection machine, a single-view security inspection machine or a CT security inspection machine, preferably the dual-view security inspection machine. The security inspection imaging unit evaluates and sorts the inspected baggage according to the security image from the radiation imaging. For example, the security inspection operator evaluates according to his/her own judgment. If it is suspected that the baggage to be inspected contains suspected objects, the security inspection operator marks (e.g., using a hand-held device) the security inspection tray bound to the baggage to be inspected, such that the baggage will be checked carefully. If there is no suspected object, the baggage to be inspected will be conveyed to a designated area from which the inspected person can take his/her baggage away. At the security inspection imaging unit 61, the inspected luggage may be manually sorted or may be automatically sorted by a baggage sorting device 62. Specifically, the baggage sorting device 62 may be provided at the exit of a security inspection channel of the X-ray security inspection device. When the X-ray security inspection device detects a piece of suspected baggage, a suspected baggage delivery device will be actuated to deliver the suspected baggage to a suspected baggage conveying device for further inspection. When the X-ray security inspection device detects a piece of normal baggage, the suspected baggage delivery device will not be actuated and the normal baggage will be delivered to a normal baggage conveying device which will convey the normal baggage to a designated area from which the inspected person will take his/her baggage away. If the inspected baggage is conveyed to the baggage sorting device 62 and there is still no determination whether the inspected baggage contains any suspected objects, the suspected baggage delivery device is actuated automatically to deliver the baggage to the suspected baggage conveying device for further inspection.

As shown in FIG. 1, the present disclosure further comprises a re-check unit 63 in the baggage check area 6. The re-check unit 63 is adapted to recheck the inspected baggage containing suspected objects after the baggage is sorted by the security inspection imaging unit 61. The re-check unit 63 is used in combination with the security inspection imaging unit 61. Specifically, the security inspection imaging unit 61 determines whether there is any suspected object in the inspected baggage according to the security image. If the security inspection imaging unit 61 determines the inspected baggage contains suspected objects, the inspected baggage will be delivered to the re-check unit 63, which will re-check the inspected baggage. At the re-check unit 63, the re-checking of the checked baggage containing suspected objects may be a manual unpacking of the baggage to further determine whether there is actually any suspected object. When the inspected baggage is suspected, the security inspection operator tells the person to be inspected to go to the re-check unit 63 in the baggage check area 6. The re-check unit 63 obtains the baggage identifier of the suspected baggage, and obtains the baggage check data (including the baggage check images, the baggage pictures, etc.) and the picture of the passenger according to the baggage identifier. The baggage then is unpacked and the suspected objects are found with reference to the baggage check data. The suspected objects are further confirmed (finding the person to be inspected according to the baggage). The security inspection operator can also obtain the biological features (e.g., facial features, fingerprint, iris, pictures, etc.) of the person to be inspected, find the pictures of baggage corresponding to the person to be inspected, and find the baggage according to the pictures of baggage (finding the baggage according to the person to be inspected). Then, the baggage from which the suspected objects have been taken out and the tray are sent back to the security inspection imaging unit 61 for re-check. The security inspection operator asks the person to be inspected about the information of the suspected objects, and chooses a response and solution according to the specific types of the suspected objects or further inspects the suspected objects by other inspection devices. If the re-check unit 63 detects the inspected baggage is normal, the baggage will be conveyed to the designated area from which the inspected person will take his/her baggage away. According to the present disclosure, the biological features of the person to be inspected can be automatically identified, the suspected baggage corresponding to the person to be inspected is found, and the suspected baggage is unpacked and checked in front of the person to be inspected.

As shown in FIG. 1 and FIG. 3, the smart security inspection system further comprises a human-body machine-check unit 71 and a human-body manual-check unit in the body check area 7. The human-body machine-check unit 71 is provided upstream of the human-body manual-check unit. When the human-body machine-check unit 71 is applied for human body check, the information of the person to be inspected is obtained, and then the person to be inspected is checked using differentiated automatic identification algorithms or inspection methods according to the pre-stored risk information of the person to be inspected (e.g., a higher risk of carrying explosives, a higher risk of carrying cold arms, a higher risk of carrying chemicals, etc.). The human-body machine-check unit 71 binds the security inspection data and results and the like of the person to be inspected to the information of the person to be inspected. After being detected as suspicious (for example, the human-body machine-check unit 71 raises the alarm), the security inspection operator may perform a body check on the person with reference to the inspection data, or alternatively the inspected person will be checked with a hand-held security inspection device at the human-body manual-check unit. After passing the check by the human-body machine-check unit 71, the inspected person can directly walk out of the body check area 7 or go to a baggage pick-up area to pick up his/her inspected baggage. When performing the human body check, the human-body machine-check unit 71 identifies the biological features of the person to be inspected through biometric identification, finds the identity information of the person to be inspected according to the biological features, and finds the risk information of the person to be inspected according to the identity information of the person to be inspected. Preferably, the human-body machine-check unit 71 of the present disclosure is a human-body security inspection device (not shown) and/or a portal-type metal detection device (for example, a metal detection gate). The present disclosure identifies the biological features of the persons, searches for corresponding identity information of the persons to be inspected and relevant security inspection records and risk information of the persons to be inspected, performs differentiated human body checks on the persons to be inspected according to the risk information and binds the inspection results to the identity information of the persons to be inspected. Therefore, the accuracy of inspection and the traceability of the inspection results can be improved.

As shown in FIG. 1 to FIG. 3, after receiving the obtained information of the person to be inspected and the baggage identifier transmitted from the baggage unpacking unit 30, the server 1 binds the information of the person to be inspected and the baggage identifier together. After receiving the security inspection image and the baggage identifier transmitted from the security inspection imaging unit 61, the server 1 binds the security inspection image and the baggage identifier together, wherein the security inspection image is obtained by the security inspection imaging unit 61 after checking the baggage to be inspected, and the baggage identifier is identified by the security inspection imaging unit 61. The server 1 binds the image of the baggage to be inspected acquired by the data acquisition unit to the baggage identifier. The server 1 binds the security inspection data and results and the like of the person to be inspected to the information of the person to be inspected. The server 1 matches the information of the person to be inspected with the information of security inspection image of the inspected baggage according to the baggage identifier and stores them therein. The server 1 stores the information of the person to be inspected therein in an associated manner, and the information of the person to be inspected and the information of security inspection image may be retrieved from the server 1, if necessary.

According to one embodiment of the present disclosure, an empty tray identification and collection system is provided at the end of the baggage check area 6 to further reduce labor cost. The empty tray identification and collection system and the security inspection imaging unit 61 are connected by an automatic conveying system to transfer the inspected baggage and the security inspection trays. After the inspected person has taken away his/her inspected baggage, the security inspection tray will be conveyed to the empty tray identification and collection system. The empty tray identification and collection system identifies the security inspection trays, and then collects and conveys the empty security inspection trays to the baggage unpacking unit 30 for reuse. After the inspected person takes away his/her from the conveyor belt in a baggage reclaim area baggage, the empty tray will be continuously conveyed. Before the tray drops into a tray collection opening, it is automatically checked whether the tray carries any object. If the tray is empty, the tray automatically drops into the tray collection opening and is automatically conveyed back. If the tray carries any object, the conveyor belt may stop the tray from dropping into the tray collection opening, and only allows it to drop into the collection opening after the object is taken away by the person to be inspected. The empty tray identification and collection system according to the present invention makes it possible to regularly manage the security inspection trays and automatically sort the inspected baggage, thereby reducing the number of required security inspectors.

As shown in FIG. 4, to further reveal the advantages of the smart security inspection system according to the present disclosure, there is provided a smart security inspection method, which is applied in the above smart security inspection system. The method comprises the following steps: distributing a baggage identifier to a piece of baggage to be inspected of a person to be inspected and binding the baggage identifier to information of the person to be inspected at a baggage unpacking station; and identifying the baggage identifier, obtaining the information of the person to be inspected according to the baggage identifier, obtaining pre-stored risk information according to the information of the person to be inspected, performing differentiated security inspections on the person to be inspected and/or the baggage according to the risk information, performing centralized processing on obtained data, and binding obtained security inspection result to the information of the person to be inspected. The smart security inspection method according to the present disclosure will be described below in detail.

Figure 5:
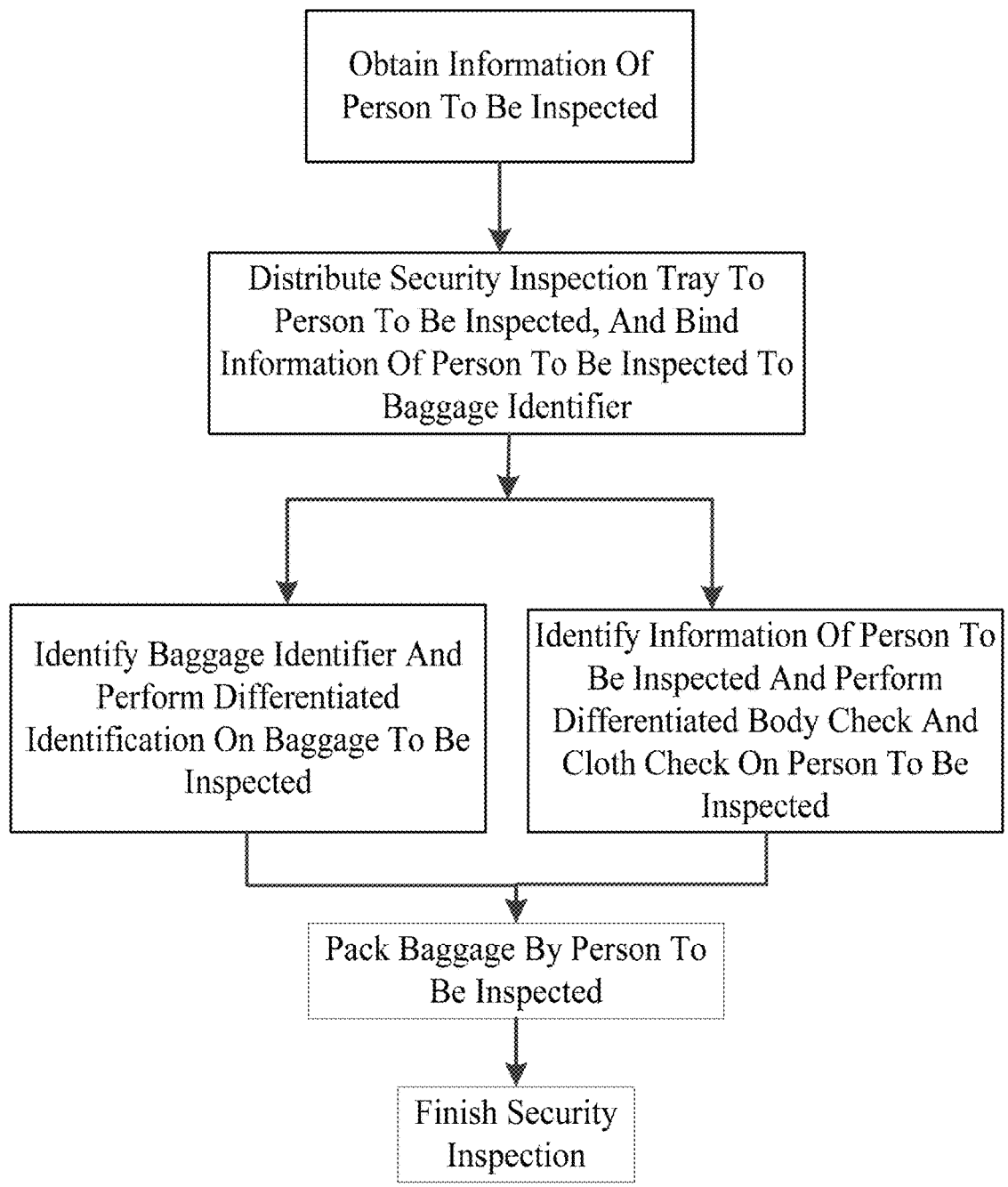
FIG. 5 is an exemplary execution flow diagram of an illustrative smart security inspection method according to one or more aspects consistent with the present innovations.
Figure 6:
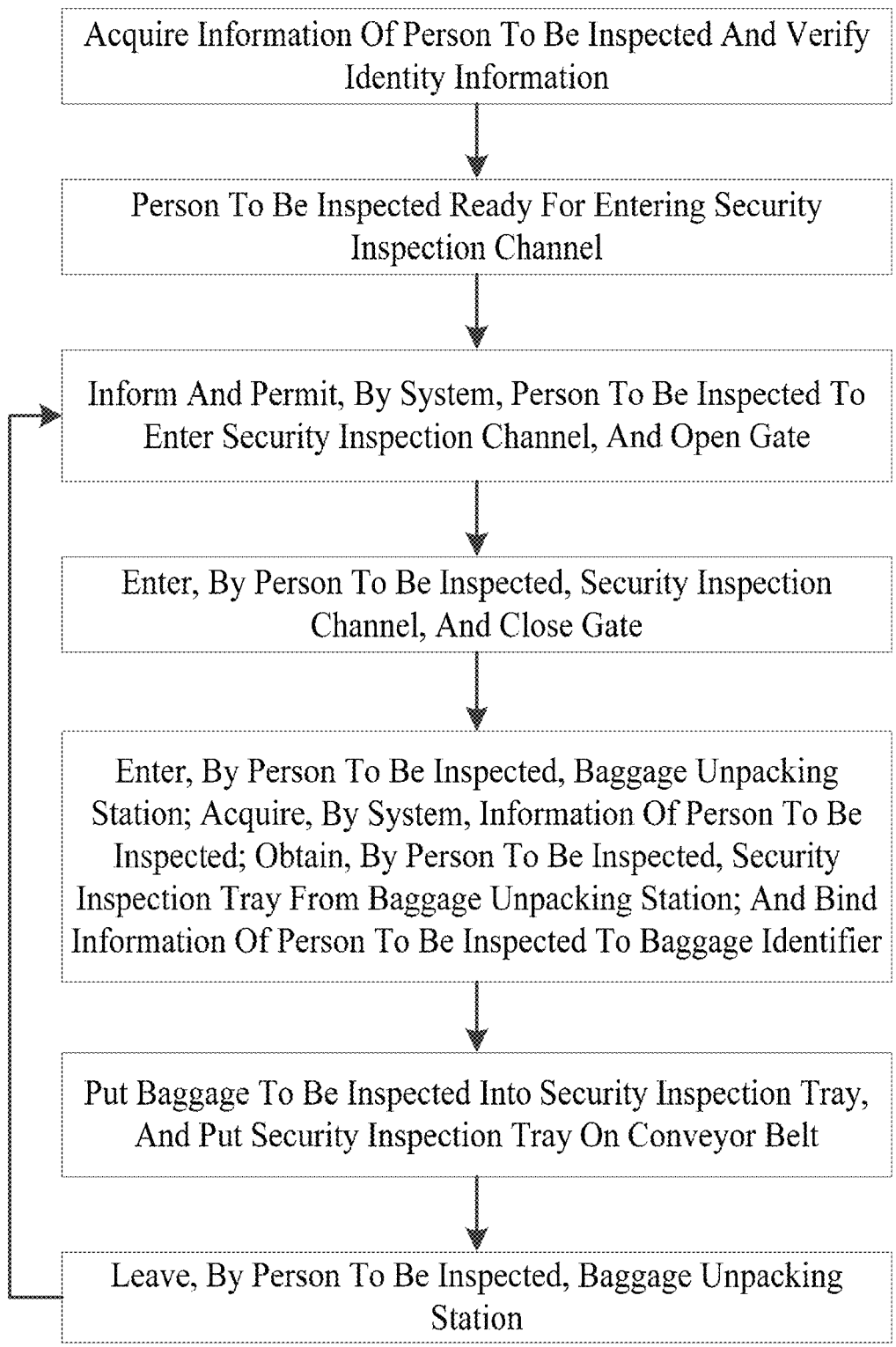
FIG. 6 is an exemplary flow diagram of distributing baggage unpacking stations and security inspection tray to persons to be inspected according to one or more aspects consistent with the present innovations.

As shown in FIG. 1, FIG. 5 and FIG. 6, when the person to be inspected enters a security inspection area, the information of the person to be inspected shall be verified and input. For example, when used at airports, the present disclosure can obtain information of a person to be inspected, for example flight information and personal identity, by scanning his/her boarding pass. When used in other places (such as customs, bus stations and the like), the present disclosure can obtain identity information of a person to be inspected by scanning his/her identity document or by accessing public security networks. Alternatively, the information of the person to be inspected can also be obtained by manual input. The information of each person to be inspected includes not only non-biological information, but also biological information (e.g., facial features, fingerprint, iris, pictures, etc.) and behavior information of the person to be inspected (e.g., voice, actions, etc.). After the identity information of the person to be inspected is verified and input, the person to be inspected is ready for entering the security inspection channel.

As shown in FIG. 1, FIG. 5 and FIG. 6, when the person to be inspected are permitted to enter the security inspection channel, the person to be inspected and the baggage to be inspected will be checked separately. A baggage unpacking station 31 is provided to the person to be inspected at which the person to be inspected takes out objects (e.g., electronic products such as computers and mobile phones) that should be checked separately. The baggage unpacking unit contains a plurality of baggage unpacking stations 31, each of which corresponds to a person to be inspected and obtains the information of the person to be inspected. Then, a security inspection tray is ejected from the baggage unpacking station 31. The automatic baggage unpacking unit 30 obtains the information of the person to be inspected, distributes a baggage identifier to the baggage, and binds the information of the person to be inspected to the baggage identifier. In this way, it is possible to accomplish information binding while several persons to be inspected pack/unpack their baggage simultaneously. After the baggage unpacking unit 30 distributes the security inspection tray the baggage to be inspected in which the baggage to be inspected will be loaded, the automatic conveying system conveys the security inspection tray that carries the baggage to be inspected to the security inspection imaging unit 61, while the person to be inspected leaves the baggage unpacking station 31.

As shown in FIG. 1, FIG. 5 and FIG. 6, the baffle gate obtains a current number of the persons to be inspected in the baggage packing/unpacking area 3 from the server 1. When the number of the persons to be inspected is smaller than the number of the baggage unpacking stations 31, it is determined that there are one or more unoccupied baggage unpacking stations 31. When there are one or more unoccupied baggage unpacking stations 31, a person to be inspected is allowed to pass through the gate to enter the baggage packing/unpacking area 3. The baffle gate at the entrance is interconnected with the server 1, and the server 1 automatically recognizes the number of the persons to be inspected in the baggage packing/unpacking area 3. When some person(s) to be inspected in the baggage packing/unpacking area 3 goes to subsequent process, the system instructs the gate, through which a certain number of persons to be inspected then are allowed to pass. The gate may automatically determine the number of the persons to be inspected to pass therethrough, and may close automatically after a permitted number of persons to be inspected have passed therethrough.

Figure 7:
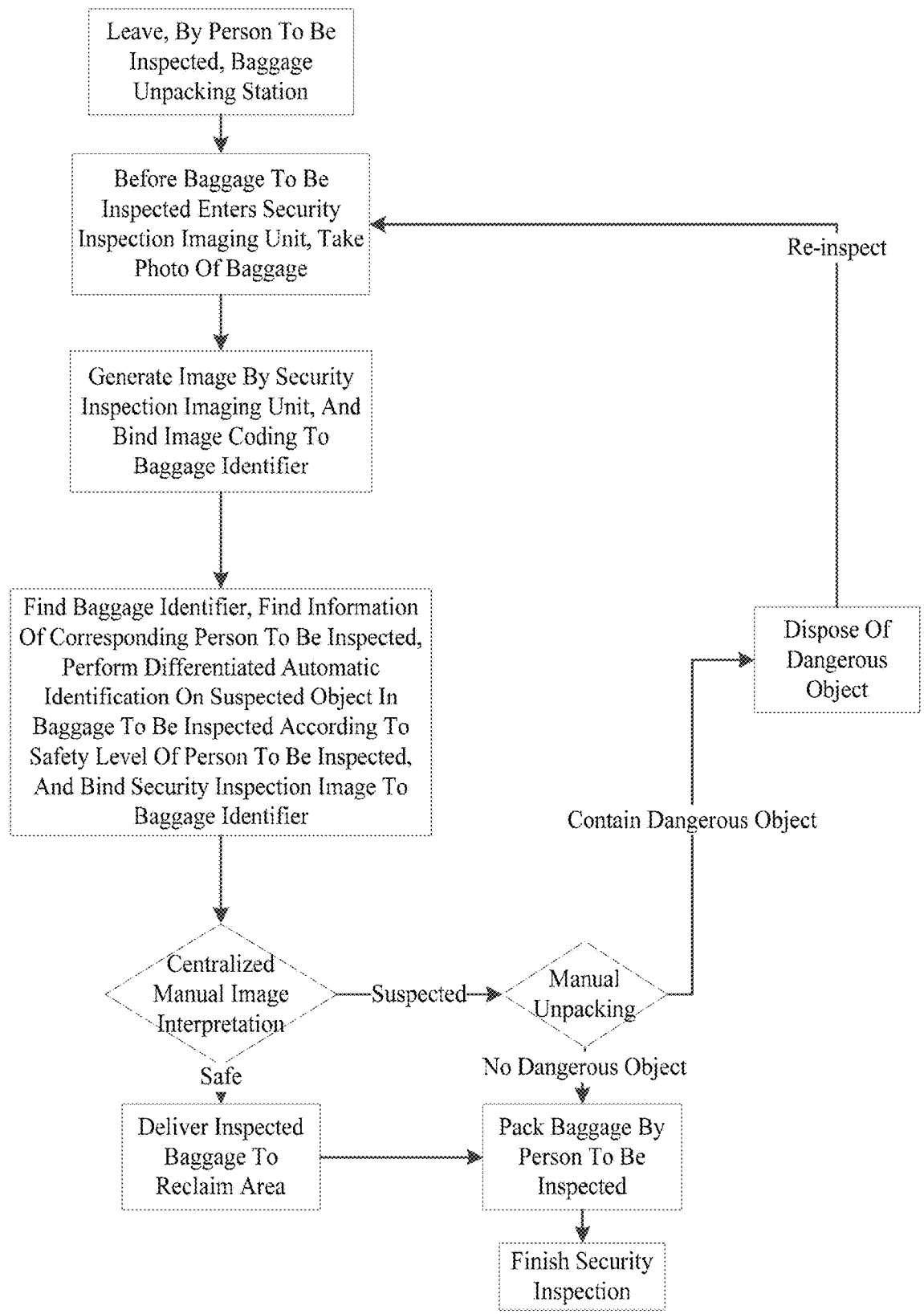
FIG. 7 is a detailed schematic flow diagram of differentiated security inspections on baggage to be inspected according to one or more aspects consistent with the present innovations.

As shown in FIG. 1, FIG. 5 and FIG. 7, before the baggage to be inspected enters the security inspection imaging unit 61, the data acquisition unit acquires an image of the baggage to be inspected and identifies the baggage identifier, and binds the acquired image of the baggage to the baggage identifier. After the image of the baggage to be inspected is acquired, the baggage to be inspected enters the security inspection imaging unit 61 for security inspection. The security inspection imaging unit 61 obtains the baggage identifier, obtains the information of the person to be inspected according to the binding relation of the baggage identifier and the person to be inspected, obtains the pre-stored risk information according to the information of the person to be inspected, performs differentiated security inspections on the baggage in the tray according to the risk information, and binds the information (such as security inspection data and result) of the baggage to be inspected to the baggage identifier. When performing differentiated security inspections on the baggage to be inspected, the security inspection imaging unit 61 carries out differentiated smart identification on the baggage to be inspected by using differentiated automatic identification algorithms or inspection methods according to the risk information of the person to be inspected (e.g., a higher risk of carrying explosives, a higher risk of carrying cold arms, a higher risk of carrying chemicals, etc.). Therefore, an accuracy of identification can be improved and an overall identification rate can be increased. While performing differentiated security inspections on the baggage to be inspected, the security inspection imaging unit 61 also accomplishes radiation imaging on the baggage to be inspected to obtain the security inspection image of the baggage to be inspected. The security inspection imaging unit 61 binds the security inspection image to the baggage identifier. As shown in FIG. 1, FIG. 5 and FIG. 7, the information obtained by the inspection is sent to the centralized data processing unit 50. The security inspection operator views the security inspection information via the centralized data processing unit 50, determines whether the baggage to be inspected is safe to generate the security inspection result. After receiving the security inspection result obtained by the centralized data processing unit 50, the server 1 binds the security inspection result to the information of the person to be inspected. The security inspection imaging unit 61 evaluates and sorts the inspected baggage according to the security image from the radiation imaging. For example, the security inspection operator evaluates according to his/her own judgment. If it is suspected that the baggage to be inspected contains suspected objects, the security inspection operator marks (e.g., using a hand-held device) the security inspection tray bound to the baggage to be inspected, such that the baggage will be checked carefully. If there is no suspected object, the baggage to be inspected will be conveyed to a designated area from which the inspected person can take his/her baggage away. If the inspected baggage is conveyed to the baggage sorting device 62 and there is still no determination whether the inspected baggage contains any suspected objects, the suspected baggage delivery device is actuated automatically to deliver the baggage to the suspected baggage conveying device for further inspection. After receiving the security inspection image and the baggage identifier transmitted from the security inspection imaging unit 61, the server 1 binds the security inspection image and the baggage identifier together, wherein the security inspection image is obtained by the security inspection imaging unit 61 after checking the baggage to be inspected, and the baggage identifier is identified by the security inspection imaging unit 61.

Figure 8:
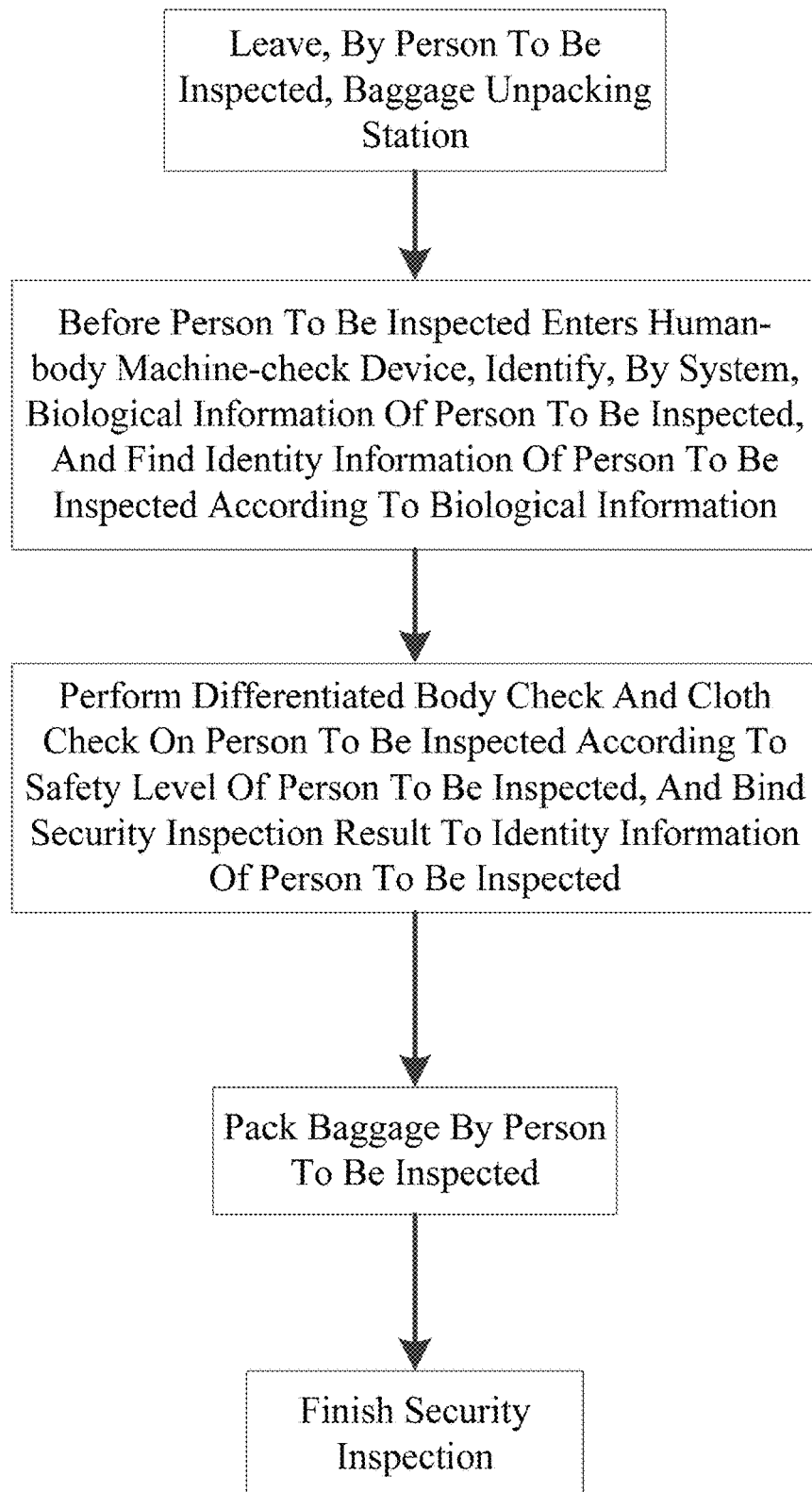
FIG. 8 is a detailed schematic flow diagram of differentiated security inspections on persons to be inspected to one or more aspects consistent with the present innovations.

As shown in FIG. 1, FIG. 5 and FIG. 8, when the human-body machine-check unit 71 is applied for human body check, the information of the person to be inspected is obtained, and then the person to be inspected is checked using differentiated automatic identification algorithms or inspection methods according to the pre-stored risk information of the person to be inspected (e.g., a higher risk of carrying explosives, a higher risk of carrying cold arms, a higher risk of carrying chemicals, etc.). The human-body machine-check unit 71 binds the security inspection data and results and the like of the person to be inspected to the information of the person to be inspected. After being detected as suspicious (for example, the human-body machine-check unit 71 raises the alarm), the security inspection operator may perform a body check on the person with reference to the inspection data, or alternatively the inspected person will be checked with a hand-held security inspection device at the human-body manual-check unit. After passing the check by the human-body machine-check unit 71, the inspected person can directly walk out of the body check area 7 or go to a baggage pick-up area to pick up his/her inspected baggage. When performing the human body check, the human-body machine-check unit 71 identifies the biological features of the person to be inspected through biometric identification, finds the identity information of the person to be inspected according to the biological features, and finds the risk information of the person to be inspected according to the identity information of the person to be inspected. The present disclosure identifies the biological features of the persons, searches for corresponding identity information of the persons to be inspected and relevant security inspection records and risk information of the persons to be inspected, performs differentiated human body checks on the persons to be inspected according to the risk information and binds the inspection results to the identity information of the persons to be inspected. Therefore, the accuracy of inspection and the traceability of the inspection results can be improved.

In conclusion, the smart security inspection system and method according to the present disclosure are capable of obtaining the risk information related to the person to be inspected according to the information of the person to be inspected, checking the person to be inspected and the baggage to be inspected with differentiated automatic identification algorithms or inspection methods according to different risk information, and thus improving the overall identification accuracy. According to the present disclosure, the inspection result of the person to be inspected and that of the baggage to be inspected are bound to the information of the person to be inspected and stored, such that the inspection accuracy and the traceability of the inspection result can be improved.

Each embodiment in this description is described in a progressive manner. Descriptions emphasize on the differences of one embodiment from another embodiment, and the same or similar parts of the embodiments just refer to each other. Concerning the apparatus embodiments, they are just simply described as being substantially similar to the method embodiments, and the correlations therebetween just refer to part of the descriptions of the method embodiments.

It should be understood by a person skilled in the art that the embodiments of the present application may be provided as methods, systems, or computer program products. Hence, the embodiments of the present application may be in the form of complete hardware embodiments, complete software embodiments, or combination embodiments of both software and hardware aspects. Moreover, the embodiments of the present application may be in the form of computer program products executed on one or more computer-readable storage mediums (including but not limited to magnetic disk memories, CD-ROMs, optical memories, etc.) containing computer-executable program codes therein.

The present application is described with reference to the flow diagrams and/or the block diagrams of the method, the apparatus (system), and the computer program product(s) according to the embodiments of the present application. It should be appreciated that computer program instructions may be adopted to implement each flow and/or block in each flow diagram and/or each block diagram, and a combination of the flows and/or the blocks in each flow diagram and/or each block diagram. These computer program instructions may be provided to a general-purpose computer, a special-purpose computer, an embedded processor or a processor of other programmable data processing equipment to generate a machine, such that the instructions executed by the computer or the processor of other programmable data processing equipment create a device for implementing functions specified in one or multiple flows of each flow diagram and/or one or multiple blocks of each block diagram.

These computer program instructions may also be stored in a computer-readable memory that is capable of guiding a computer or the other programmable data processing equipment to work in a specific mode; the instructions stored in the computer-readable memory are enabled to create an article of manufacture including an instruction device for implementing functions specified in one or more flows of each flow diagram and/or one or more blocks of each block diagram.

These computer program instructions may be loaded on a computer or other programmable data processing equipment, so that a series of operation steps can be executed on the computer or the other programmable data processing equipment to generate processing implemented by the computer; in this way, the instructions executed on the computer or the other programmable data processing equipment provide steps for implementing functions specified in one or more flows of each flow diagram and/or one or more blocks of each block diagram.

Although the preferred embodiments of the present application are already described, those skilled in the art can make another alterations and modifications to these embodiments once they learn about the basic creative concept. Hence, the appended claims are intended to be interpreted as including the preferred embodiments and all the alterations and modifications falling into the scope of the present application.

Finally, it still needs to be noted that relational terms such as first, second, and the like herein are merely used for differentiating one entity or operation from another entity or operation rather than definitely requiring or implying any actual relationship or order between these entities or operations. In addition, the terms "comprising" and "containing", or any other variants thereof are intended to cover non-exclusive containing, such that a process, a method, an article or an apparatus including a series of elements includes not only those elements, but also other elements not explicitly listed, or further includes inherent elements of the process, the method, the article or the apparatus. Without more limitations, elements defined by the sentence of "comprising a . . . " shall not be exclusive of additional same elements also existing in the process, the method, the article or the apparatus.

The above embodiments are merely used for illustrating, rather than limiting the present disclosure. Various changes and variations can also be made by a person of ordinary skill in the related art without departing from the spirit and the scope of the present inventions/disclosure. Therefore, all the equivalent technical solutions also fall into the scope of the present disclosure, and the scope of patent protection of the present disclosure is defined by the claims.

What is claimed is:

1. A smart security inspection system, the system comprising:
   a server, an input device in an information input area, a baggage unpacking unit in a baggage packing/unpacking area that comprises a plurality of baggage unpacking stations, a security inspection unit comprising a security inspection imaging machine and a human-body check machine in a security inspection area, a baggage sorting device comprising a first conveyor and a second conveyor and a centralized data processor in a processing area;
   wherein the baggage packing/unpacking area is arranged upstream of the security inspection area;
   wherein the information input area is arranged upstream of the baggage packing/unpacking area, the processing area is arranged far away or close to the security inspection area;
   wherein the input device, the baggage unpacking unit, the security inspection unit and the centralized data processor are in communication connection with the server, respectively;
   wherein the input device obtains information of a person to be inspected by scanning the person to be inspected or scanning an identity document of the person to be inspected;
   wherein the baggage unpacking unit obtains the information of the person to be inspected and distributes a baggage identifier to a piece of baggage to be inspected of the person to be inspected; the baggage unpacking unit binds the baggage identifier and the information of the person to be inspected;
   wherein the security inspection unit obtains pre-stored risk information according to the information of the person to be inspected, performs differentiated security inspections on the person to be inspected and the baggage by using differentiated automatic identification algorithms or inspection methods according to the risk information, and sends obtained data to the centralized data processor;

wherein the security inspection imaging machine obtains the baggage identifier, obtains the information of the person to be inspected according to a binding relation of the baggage identifier and the information of the person to be inspected, obtains the pre-stored risk information according to the information of the person to be inspected, and performs differentiated security inspections on the baggage according to the pre-stored risk information;

wherein the centralized data processor evaluates the person to be inspected and the baggage according to the obtained data, generates a security inspection result, and binds the security inspection result with the information of the person to be inspected;

wherein the server matches the information of the person to be inspected with the security inspection result and stores them, and wherein the baggage sorting device is arranged downstream of the security inspection unit where if the inspected baggage is detected as normal baggage, the baggage is delivered through the first conveyor to a designated area from which the inspected person will take his/her baggage away, and if the inspected baggage is conveyed to the baggage sorting device and there is no determination whether the inspected baggage contains any suspected objects the baggage is delivered through the second conveyor for further inspection.

2. The smart security inspection system of claim 1, wherein each of the baggage unpacking stations corresponds to a person to be inspected, and the baggage unpacking unit distributes the baggage identifier and binds the information of the person to be inspected to the baggage identifier.

3. The smart security inspection system of claim 2, wherein a baffle gate is arranged at an entrance of the baggage packing/unpacking area;
wherein the baffle gate is connected with the server; and
wherein the server obtains the number of persons to be inspected in the baggage packing/unpacking area, and the baffle gate is opened or closed according to the number.

4. The smart security inspection system of claim 1, further comprising a camera;
wherein, before the baggage to be inspected enters the security inspection imaging machine, the camera acquires an image of the baggage to be inspected and identifies the baggage identifier, and binds the acquired image of baggage to the baggage identifier.

5. A smart security inspection method, comprising:
distributing, with a baggage unpacking unit, a baggage identifier to a piece of baggage to be inspected of a person to be inspected and binding the baggage identifier to information of the person to be inspected at a baggage unpacking station, wherein the baggage unpacking unit comprises a plurality of baggage unpacking stations;
identifying, with a security inspection unit, the baggage identifier, obtaining the information of the person to be inspected according to the baggage identifier, obtaining pre-stored risk information according to the information of the person to be inspected, wherein the security inspection unit comprises a security inspection imaging machine and a human-body check machine;

performing, with a centralized data processor, differentiated security inspections on the person to be inspected and the baggage using differentiated automatic identification algorithms or inspection methods according to the risk information, performing centralized processing on obtained data, and binding obtained security inspection results to the information of the person to be inspected, wherein the security inspection imaging machine obtains the baggage identifier, obtains the information of the person to be inspected according to a binding relation of the baggage identifier and the information of the person to be inspected, obtains the pre-stored risk information according to the information of the person to be inspected, and performs differentiated security inspections on the baggage according to the pre-stored risk information;

matching, with a server, the information of the person to be inspected with the security inspection result and storing them; and automatically delivering, with a baggage sorting device comprising a first conveyor and a second conveyor downstream of the security inspection unit, the inspected baggage through the first conveyor to a designated area from which the inspected person will take his/her baggage away if the inspected baggage is detected as normal baggage, and automatically delivering the inspected baggage through the second conveyor for further inspection if the inspected baggage is conveyed to the baggage sorting device and there is no determination whether the inspected baggage contains any suspected objects.

6. The smart security inspection method of claim 5, further comprising inputting and verifying identity information of the person to be inspected by scanning the person to be inspected or scanning an identity document of the person before obtaining the information of the person to be inspected.

7. The smart security inspection method of claim 5, further comprising:
simultaneously distributing, with the baggage unpacking unit, baggage identifiers to a plurality of persons to be inspected in the baggage packing/unpacking area;
controlling, with a baffle gate, a number of the persons to be inspected entering the baggage packing/unpacking area according to a number of the persons to be inspected in the baggage packing/unpacking area.

8. The smart security inspection method of claim 5, further comprising taking, with a camera, an image of the baggage and binding the image to the baggage identifier prior to performing the differentiated security inspections on the person to be inspected and the baggage.

9. The smart security inspection method of claim 6, further comprising:
simultaneously, with the baggage unpacking unit, distributing baggage identifiers to a plurality of persons to be inspected in the baggage packing/unpacking area; and
controlling, with a baffle gate, a number of the persons to be inspected entering the baggage packing/unpacking area according to a number of the persons to be inspected in the baggage packing/unpacking area.

10. The smart security inspection method of claim 6, further comprising taking, with a camera, an image of the baggage and binding the image to the baggage identifier prior to performing the differentiated security inspections on the person to be inspected and the baggage.

11. The smart security inspection method of claim 9, further comprising taking, with a camera, an image of the baggage and binding the image to the baggage identifier prior to performing the differentiated security inspections on the person to be inspected and the baggage.

12. The smart security inspection method of claim 7, further comprising taking, with a camera, an image of the baggage and binding the image to the baggage identifier prior to performing the differentiated security inspections on the person to be inspected and the baggage.

* * * * *